United States Patent
Kwon (10) Patent No.: US 6,637,565 B2
(45) Date of Patent: Oct. 28, 2003

(54) METHOD FOR CONTROLLING A DAMPER CLUTCH OF AN AUTOMATIC TRANSMISSION

(75) Inventor: Hyuk-Bin Kwon, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/033,311

(22) Filed: Dec. 26, 2001

(65) Prior Publication Data

US 2002/0084160 A1 Jul. 4, 2002

(30) Foreign Application Priority Data

Dec. 28, 2000 (KR) .......................................... 2000-84339

(51) Int. Cl.$^7$ ............................................... F16H 61/14
(52) U.S. Cl. ...................... 192/3.29; 192/82 T; 477/76; 477/98
(58) Field of Search ................................ 192/3.29, 3.3, 192/82 T; 477/98, 76; 701/55

(56) References Cited

U.S. PATENT DOCUMENTS

| | | | | |
|---|---|---|---|---|
| 4,828,082 A | * | 5/1989 | Brand et al. ................. | 192/3.3 |
| 5,307,269 A | * | 4/1994 | Kohno ...................... | 192/82 T |
| 5,347,885 A | | 9/1994 | Taga et al. | |
| 5,707,315 A | * | 1/1998 | Furukawa et al. ............ | 477/98 |
| 5,722,912 A | | 3/1998 | Narita | |
| 5,799,260 A | * | 8/1998 | Droste et al. ................. | 701/51 |
| 5,802,490 A | * | 9/1998 | Droste ...................... | 192/3.29 |
| 5,803,217 A | | 9/1998 | Park | |
| 5,833,579 A | | 11/1998 | Ghil | |
| 5,882,279 A | | 3/1999 | Ueki | |
| 5,954,618 A | | 9/1999 | Mikami et al. | |
| 5,960,669 A | * | 10/1999 | Ohashi et al. ................. | 477/98 |
| 6,019,703 A | | 2/2000 | Black et al. | |
| 6,026,784 A | * | 2/2000 | Weisman et al. ........... | 123/436 |
| 6,039,675 A | | 3/2000 | Adachi et al. | |
| 6,070,117 A | * | 5/2000 | Yamada et al. ............... | 701/55 |
| 6,139,472 A | | 10/2000 | Harada et al. | |
| 6,146,309 A | | 11/2000 | Nishino et al. | |

* cited by examiner

Primary Examiner—Rodney H. Bonck
(74) Attorney, Agent, or Firm—Pennie & Edmonds LLP

(57) ABSTRACT

A method for controlling a damper clutch of an automatic transmission that can perform a normal shifting quality by selecting a correction value according to an outside air temperature for direct connection of the damper clutch and delaying the direct connection of the damper clutch until the operational oil temperature rises by considering the correction value to thereby enable it to get to an appropriate degree of operational oil temperature, a normal state of operational oil, the method for controlling a damper clutch of an auto transmission comprising the steps of: detecting the outside air temperature; correcting oil temperature to determine a point of time for direct connection of the damper clutch according to the determined outside air temperature; and performing controlling operations for direct connection of the damper clutch with a requirement that the operational oil temperature reaches to the correction value.

18 Claims, 5 Drawing Sheets

| OUTSIDE AIR TEMPERATURE (°C) | -40 UNDER | -35 | -30 | -25 | -20 | -15 | -10 | -5 | 0 | 5 | 10 OVER |
|---|---|---|---|---|---|---|---|---|---|---|---|
| CORRECTION VALUE OF OPERATIONAL OIL TEMPERATURE (°C) | 30 | 25 | 20 | 15 | 12 | 10 | 8 | 6 | 4 | 2 | 0 |

METHOD FOR CONTROLLING A DAMPER CLUTCH OF AN AUTOMATIC TRANSMISSION

BACKGROUND OF THE INVENTION

1. Field of the Invention

The present invention relates to a damper clutch of an automatic transmission and more particularly to a method and apparatus for controlling a damper clutch of an automatic transmission to improve shifting quality.

2. Brief Description of the Related Art

In general, a torque converter included in an automatic transmission is positioned between a crank shaft and transmission to multiply torque generated by engine and convey it to an input shaft of the transmission. The torque converter has a damper clutch for direct connection between crank shaft of the engine and input shaft of the transmission to improve fuel consumption by making a progress in energy efficiency when power is transmitted from the crank shaft of the engine to the input shaft of the transmission. Conventionally, the damper clutch is changed to its direct connection state through as long a period of time as possible in consideration of a better fuel consumption.

Besides, the direct connection of the damper clutch as such is made by operational pressure controlled by a control unit of the auto transmission. Operational conditions for the direct connection of the damper clutch generally are limited as follows: the temperature of an automatic transmission oil (generally named ATF, hereinafter referred to as operational oil) is kept at a constant state of over 30° C.; the shift is not set at a parking, neutral or rear range; the running state of a vehicle is within the operational range of shifting patterns; vehicle is not in the process of shifting operations; and the shift is at its over 3rd or 4th running speed range.

Accordingly, if a vehicle's running speed range and openness of a throttle valve are over predetermined values and if the operational oil temperature rises over a predetermined level while the shift is set at its over 3rd or 4th running speed range, the damper clutch will operate to convey the driving force transmitted from an engine to an input shaft of the shift by direct connection, thereby improving its fuel consumption.

After the damper clutch is directly connected, the operational oil temperature rises over a predetermined level in a running vehicle. Typically, the operational oil temperature rises to about 80 through 100° C. and gets to this normal temperature state. Within this normal temperature range, the most precise tuning operations may be made for shifting quality. Therefore, it is the most advantageous to keep the normal temperature range of operational oil at about 80 through 100° C. for the best shifting quality.

Although there have been attempts to alleviate shifting impact generated at the time of shifting of a conventional automatic transmission, such as by changing the operational range of the damper clutch according to the degree of outside pressure at a vehicle's running area and by compensating a reduction in the driving force conveyed from the engine to the transmission, there has been developed no technique to control the operations of a damper clutch in considering the operational oil temperature relative to outside air temperature.

If a vehicle is running in winter or in the area like northern Europe and northern America where the outside air temperature is very low, the operational oil temperature does not rise close to 80 through 100° C., but keeps its normal state at a lower temperature even after direct connection of the damper clutch of the torque converter by satisfying all relevant conditions. This is because heat emitted from the torque converter to outside at a lower temperature is of great quantity.

Figure 1:
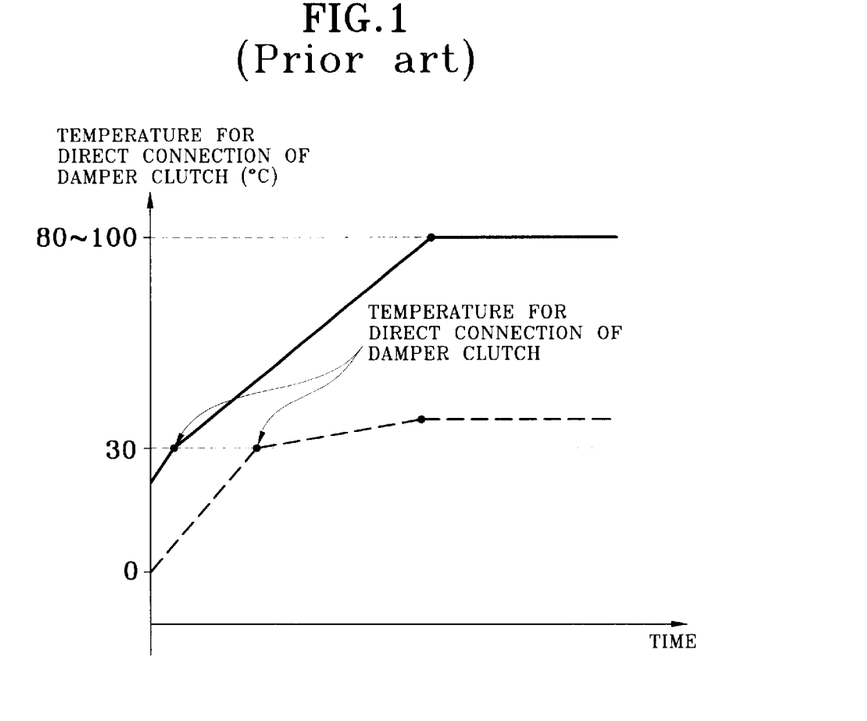
FIG. 1 is a graph illustrating cases in which the operational oil temperature reaches normal or abnormal states after a direction connection of a conventional damper clutch.

For instance, as shown in FIG. 1, if a vehicle is running in winter or in the area like northern Europe and northern America where the outside air temperature is low, the operational oil temperature does not rise close to 80 through 100° C. (illustrated with a solid line) but keeps its normal state at a lower degree of an abnormal temperature range (illustrated with a dot line), even after direct connection of the damper clutch of the torque converter by satisfying all its relevant conditions. Thus, in the area where the outside air temperature is relatively low, the operational oil temperature does not get to its normal state at the range of about 80 through 100° C. due to the great amount of heat emitted from the torque converter, but gets to its normal state at a lower temperature range, thereby deteriorating shifting quality of the automatic transmission.

SUMMARY OF THE INVENTION

It is one object of the present invention to solve the aforementioned problem and provide a method for controlling a damper clutch of an automatic transmission that can perform a normal shifting quality by selecting a correction value according to an outside air temperature for direct connection of the damper clutch and delaying the direct connection of the damper clutch until the operational oil temperature rises by considering the correction value to thereby enable it to get to an appropriate degree of operational oil temperature, i.e., a normal state of operational oil.

Thus, according to the present invention, there is provided a method for controlling a damper clutch of an automatic transmission, which includes detecting the outside air temperature, correcting oil temperature to determine a point of time for a direct connection of the damper clutch according to the determined outside air temperature, and performing controlling operations for direct connection of the damper clutch with a requirement that the operational oil temperature reaches to the correction value. In a preferred embodiment, the step of determining the outside air temperature includes detecting the operational oil temperature at an initial start stage, obtaining a rate of increase in the operational oil temperature according to the amount of heat generation of a torque converter over a predetermined initial period of time, and estimating the outside air temperature with the increase rate in the operational oil temperature due to the amount of heat generation of the torque converter.

Also, correcting the direct connection temperature of the damper clutch may be made by using mapped data of various correction values experimentally estimated according to various outside air temperature ranges to enable the operational oil to get to its normal state within a predetermined range of temperature at the time of tuning the transmission.

According to an alternative embodiment of the invention for controlling a damper clutch in an automatic transmission, a controller controls a process of determining an outside air temperature in which the transmission is operating, determining a point for direct connection of the torque converter to the transmission based on the determined outside air temperature, and controlling the damper clutch for direction connection in accordance with said determined point. Preferably, the point for direct connection corresponds to a temperature of operating oil in the transmission. Further, the determining the outside air temperature may be based on sensing an operational oil temperature for the transmission at an initial start stage, determining an amount of heat generated by the torque converter over a predetermined initial time period, determining a rate of increase in the operational oil temperature of said predetermined time period based on the amount of heat generated, and estimating the outside air temperature based on the sensed oil temperature and the determined rate of increase of the oil temperature.

In a further alternative embodiment, the determining of a point for direct connection includes selecting an oil temperature correction value corresponding to a difference between a normal direct connection temperature and a direction connection temperature adjusted for the determined outside air temperature. Preferably, the correction value is selected from a predetermined data map of correction values corresponding to outside temperatures that has been experimentally determined.

In another embodiment of the invention, a power transmission system is provided, which includes a torque converter receiving power input, an automatic transmission providing power output and a damper clutch operatively connecting said torque converter and transmission and providing for direct connection therebetween. An operating oil temperature sensor communicates with the transmission and a controller. The controller receives oil temperature input from said sensor and operatively communicates with the damper clutch to control direct connection of the torque converter and automatic transmission. The controller may include one or more processors and include instructions for controlling the damper clutch. Such instructions may involve estimating outside air temperature based on sensed operating oil temperature and heat generated by the torque converter, determining an operating temperature for direction connection based on the estimated outside air temperature, and controlling the damper clutch to directly connect the torque converter and automatic transmission at the determined operating temperature for direct connection. In a preferred embodiment, the system also includes a solenoid valve operatively connected to the damper clutch to effectuate direction connection.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, preferred embodiments of the present invention will be described in detail with reference to accompanying drawings.

Figure 6:
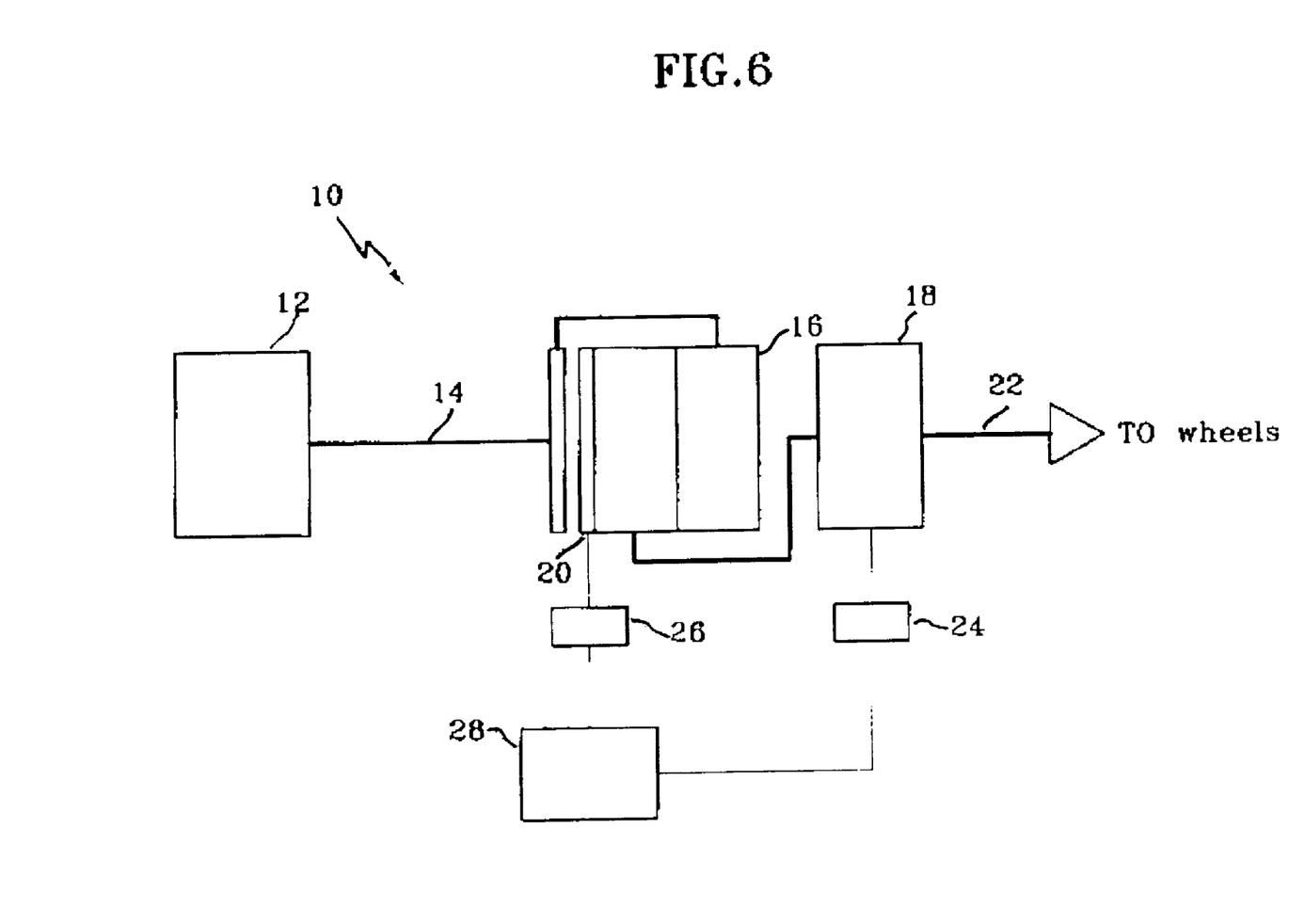
FIG. 6 is a schematic diagram illustrating an apparatus for controlling a damper clutch according to the present invention.

As schematically illustrated in FIG. 6, a power transmission system according to the present invention generally includes an engine 12 coupled to a torque converter 16 via crankshaft 14 or other suitable means. Torque converter 16 transfers power generated by the engine 12 to transmission 18. Drive shaft 22 or other suitable means transfers power out of the transmission, such as to the vehicle differential or wheels. Transmission oil temperature sensor 24 monitors the temperature of the operating oil and communicates such information to transmission control unit 28. Control unit 28 controls, inter alia, solenoid valve 26 at damper clutch 20 to enable direct connection of the engine and transmission for optimum power transmission as described below in greater detail. Control unit 28 includes appropriate processor(s) as may be selected and programmed by persons of ordinary skill in the art in accordance with the present invention as described herein.

According to the present invention, a controlling method for direct connection of the damper clutch includes the steps of: determining the outside air temperature; correcting the direct connection temperature to determine a point of time for direct connection of the damper clutch according to the determined outside air temperature; and performing controlling operations for direct connection of the damper clutch with a requirement that the operational oil temperature rises to its corrected degree.

Furthermore, the step of determining the outside air temperature includes the processes of: detecting the operational oil temperature at an initial starting stage; obtaining the rate of increase in operational oil temperature due to the amount of heat generated by the torque converter over a predetermined initial period of time; and estimating the outside air temperature based on the operational oil temperature as increased by the amount of heat generated by the torque converter. If the initial starting operation of an engine is made while a vehicle is completely parked, it may be assumed that the operational oil temperature is identical to that of the outside air temperature. On the other hand, if the engine is re-started after being more recently turned off, the operational oil temperature is not identical to, but rather higher than the outside air temperature. The aforementioned processes are performed to prevent any error from being made by using the operational oil temperature to estimate the outside air temperature.

According to a preferred embodiment, the operational oil temperature at the initial start of the engine is detected with the oil temperature detecting sensor 24 mounted at the transmission, and a rate of increase (dT) in the operational oil temperature over the predetermined initial period of time can be estimated by using the oil temperature detecting sensor.

In addition, in estimating the rate of increase in the operational oil temperature relative to the amount of heat generated by the torque converter during the predetermined period of time, the amount of heat generated (Q) by the torque converter can be obtained from a difference between the energy input to the torque converter for a predetermined period of time and the energy output from the torque converter. The relevant formulas are as follows:

$$Q = \int_0 (T_E N_E - T_T N_T) dt$$

where, the following equation are defined, $T_E = T_i = cN_E^2$ (an experimental formula calculated while torque converter is interpreted)

$Q = \int_0 (cN_E^2 N_E - T_T N_T) dt$, from which formula, following formula is made.

$\eta = T_T N_T / T_E N_E$, Therefore, it can be defined as, $Q = \int_0 (cN_E^2 N_E - \eta cN_E^2 N_3) dt = \int_0 (1-\eta) cN_E^2 N_E dt = \int_0 (1-\eta) cN_E^3 dt$ In the formulas listed above, respective reference symbols are defined as follows:

Q indicates an amount of heat generated by the torque converter;

TE and NE respectively indicate the torque and the rotation number of an engine;

TT and NT respectively indicate the torque and the rotation number of a torque converter;

c is a capacity coefficient of a torque converter; and

η is a transmission efficiency of a torque converter.

The capacity coefficient and transmission efficiency according to the speed rate of the torque converter at the initial start of the engine can be obtained by the above listed formula.

Figure 2:
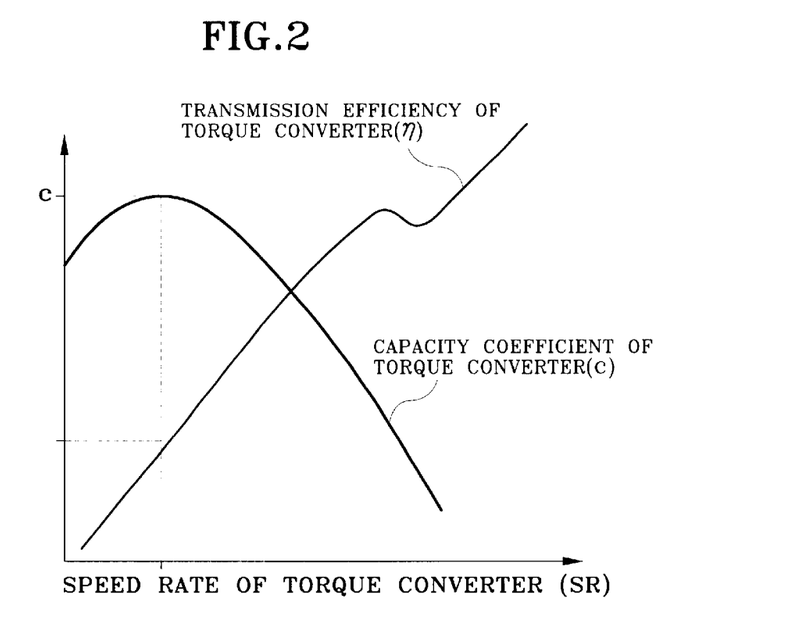
FIG. 2 is a graph illustrating a characteristic curve of a torque converter to obtain capacity coefficient and transmission efficiency according to its speed rate for a method for controlling a damper clutch in accordance with the present invention.

The capacity coefficient (c) and transmission efficiency (η) of the torque converter relative to the corresponding speed rate (SR) are determined by a characteristic curve of the torque converter shown in FIG. 2, that has been obtained by functional test results of the torque converter. The speed rate of the torque converter may be estimated by the following formula:

$$SR = NT/NE$$

where, the revolution of the turbine and that of the engine can respectively be measured by a pulse generator (PG-A) of the automatic transmission and the crank position sensor.

Therefore, when the engine is initially started, the amount of heat generation of the torque converter relative to the speed rate of the torque converter is obtained from the formula. Then, a rate of increase in the operational oil temperature according to the amount of heat generation of the torque converter is obtained and compared with the rate of increase in the operational oil temperature relative to the corresponding outside air to estimate the temperature of the present outside air.

Figure 3:
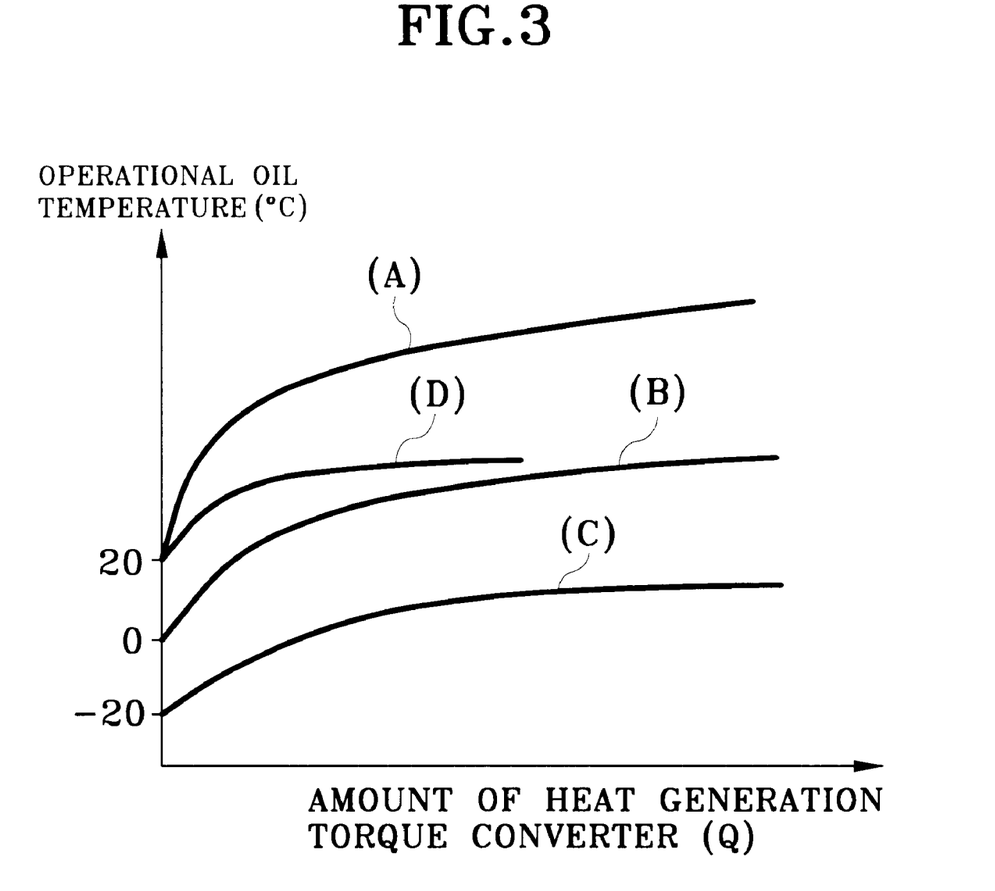
FIG. 3 is a graph illustrating changes in the operational oil temperature compared to the amount of heat emitting from a torque converter according to outside air temperature in various cases.

In other words, it is possible to estimate the present outside air temperature from an increase in rate of the operational oil temperature relative to the amount of heat generated by the torque converter by using the graph shown in FIG. 3, which reveals a measurement of changes in the operational oil temperature according to the various outside air temperature ranges against the amount of heat generated by the torque converter. When an increase in rate in the operational oil temperature against the amount of heat generation of the torque converter and a change rate in the operational oil temperature caused by the heat emission of the torque converter from the related outside air temperature become identical, it is possible to quite correctly estimate the present outside air temperature at the initial or the second start of the engine.

Curves (A), (B), (C) illustrate changes in the operational oil temperature when the outside air temperatures relative to the amount of heat generated by the torque converter are 20° C., 0° C., −20° C. On the other hand, curve (D) illustrates the operational oil temperature that rises because of heat emission of the torque converter after the present operational oil temperature starts at 20° C.

In the case of curve (D), the initial operational oil temperature is the same as shown in curve (A), but a rate of increase in the operational oil temperature against the amount of heat generation of the torque converter is different from that shown in curve (A). Thus, it can be confirmed in curve (D) that the present outside air temperature is not 20° C. and that a rate of increase in the operational oil temperature against the amount of heat generated by the torque converter is the same as shown in curve (B). As a result, it becomes possible to assume that the outside air temperature is 0° C.

In other words, curve D illustrates the case where the operational oil temperature is not identical to the present outside air temperature when the engine is re-started.

Therefore, the temperature of the outside air can be estimated by comparing the rate of increase in the operational oil temperature with the amount of heat generated by the torque converter through the aforementioned process, and a temperature correction value may be determined to predict the optimum time of direct connection of the damper clutch corresponding to the relevant outside air temperature later.

Figure 4:
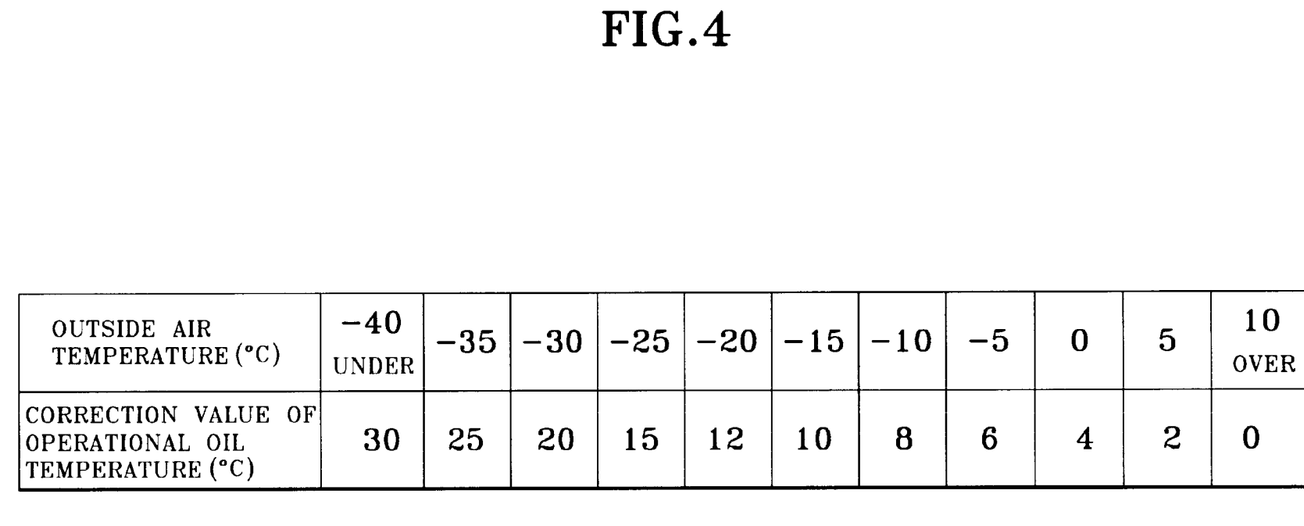
FIG. 4 is a Table illustrating the mapped data for selecting a correction value to the operational oil temperature to control the time for direct connection of a damper clutch according to various outside air temperature ranges.

According to a preferred embodiment of the invention, the correction value of temperature is selected and determined at the time of direct connection of the damper clutch according to the outside air temperature on the basis of the Table shown in FIG. 4, which shows a map of data acquired by experimental estimation processes. Through the processes, it can be discriminated whether the operational oil temperature is appropriate to satisfy the shifting quality requirements of the automatic transmission. Ideally this at the temperature range of 80° C. through 100° C. preset at the time of tuning of the transmission, i.e., at the normal state where the operational oil temperature goes to normal after the direct connection of the damper clutch. In other words, in order to achieve the normal state of the operational oil temperature range, at 80° C. through 100° C., after direct connection of the damper clutch at various outside air temperature ranges, the direct connection temperature must be corrected. The Table shown in FIG. 4 is a map of data for selecting the correction value of temperature that can help to determine what degree of an additional increase should be considered to the temperature of 30° C. at which the damper clutch is generally connected.

Thus, according to a preferred embodiment, a correction value may be selected according to the present outside air temperature. If direct connection of the damper clutch is made at the temperature of 30° C., the temperature generally used for a direct connection of the damper clutch, plus the correction value, it becomes possible for the operational oil to go to its normal state after the direct connection; that is, to reach the preset temperature range of 80° C. through 100° C. at the time of tuning the transmission for achieving its normal shifting quality. After selection of the correction value needed to let the operational oil temperature reach its normal state according to the outside air temperature as described above, the transmission control unit 28 detects the present operational oil temperature for the direct connection of the damper clutch 20 and controls solenoid valve 26 at the damper clutch to cause direct connection of the clutch as known in the art.

Figure 5:
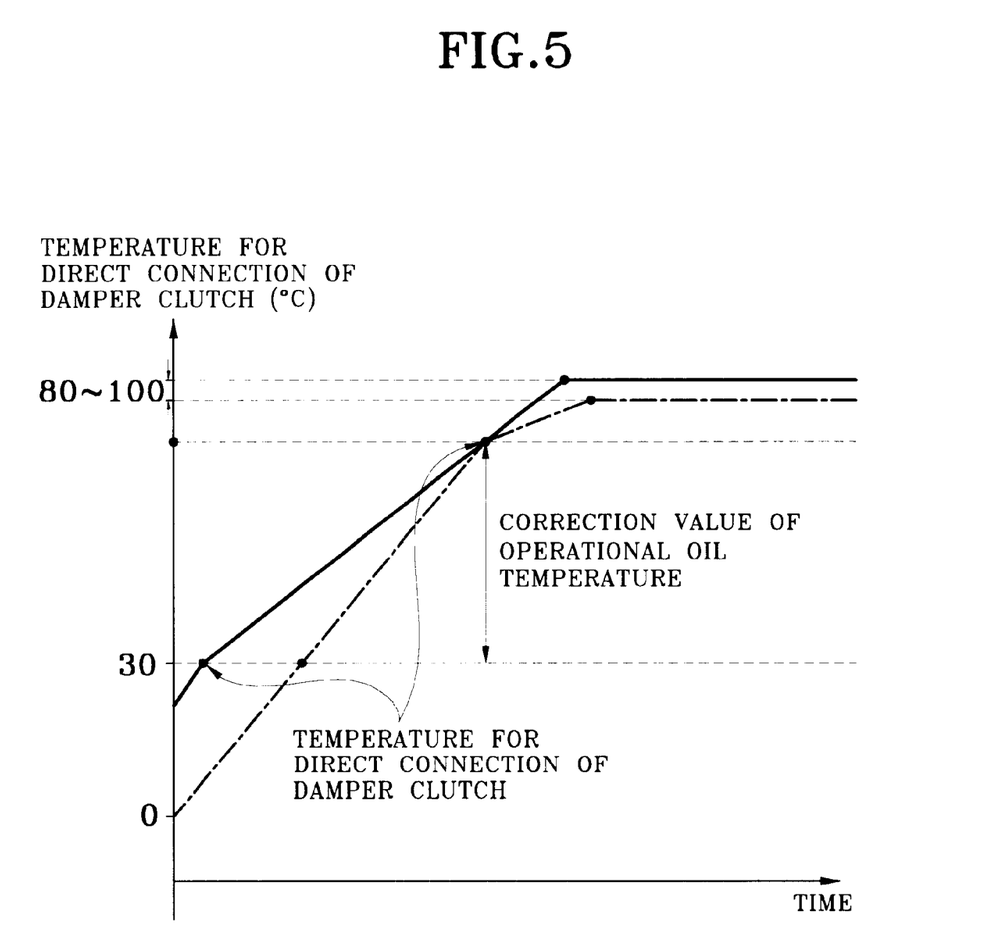
FIG. 5 is a graph illustrating changes in the operational oil temperature that reaches its normal state after direct connection of a damper clutch in case that the direct connection temperature of the damper clutch is corrected after determination of the outside air temperature.

As shown in FIG. 5, the operational oil temperature of a car running at a low outside air temperature that reaches its normal state after direct connection of the damper clutch at a temperature (X), i.e., the temperature obtained by adding a correction value, higher than 30° C., and can rise correspondingly to the temperature range of 80° C. through 100° C., the same range at which the car running at normal temperature reaches its normal state after the damper clutch is directly connected at 30° C. As a result, the shifting quality of the car can be satisfactory.

Therefore, after a direct connection of the damper clutch is made at a level of temperature obtained by considering a correction value, the operational oil temperature reaches its normal state by reception of heat emitting from the torque converter, that is, rising to the temperature range of 80° C. through 100° C. Therefore, there will be no problem such as deterioration of the shifting quality that may occur at the time of shifts.

As described above, there are advantages in the method and apparatus for controlling the damper clutch of the automatic transmission in accordance with the present invention in that, even when there is a difference between the operational oil temperature for the re-start of the engine and that of actual outside air temperature, the outside air temperature can be accurately determined for the direct connection of the damper clutch; that the direct connection of the damper clutch is made when the operational oil temperature gets to the level of temperature obtained by considering a correction value selected for determination of a time to make a direct connection of the damper clutch; and that the operational oil temperature getting to its normal state can reach the preset temperature range of 80° C. through 100° C. at the time of tuning of the transmission, thereby reducing any impact in shifting.

What is claimed is:

1. A method for controlling a damper clutch of an automatic transmission, comprising:
    determining an outside air temperature;
    determining an oil temperature correction value corresponding to a point of time for direct connection of the damper clutch according to the determined outside air temperature;
    measuring an operational oil temperature; and
    controlling operation of the damper clutch for direct connection when the operational oil temperature reaches the correction value.

2. The method, as defined in claim 1, wherein the step of determining the outside air temperature comprises:
    detecting operational oil temperature of the transmission at an initial start stage;
    obtaining a rate of increase in the operational oil temperature according to an amount of heat generated by a torque converter cooperating with the transmission over a predetermined initial period of time; and
    estimating the outside air temperature based on the rate of increase.

3. The method, as defined in claim 2, wherein the amount of heat generated (Q) by the torque converter is estimated as:

$$Q = \int_0 (1-\eta) c N_E^3 \, dt$$

wherein, $N_E$ is a rotation number of an engine, c is a capacity coefficient of a torque converter, and is a transmission efficiency of a torque converter.

4. The method, as defined in claim 3, wherein the capacity coefficient and transmission efficiency of the torque converter are determined at a characteristic curve relative to the speed rate of the torque converter.

5. The method, as defined in claim 4, wherein the speed rate of the torque converter is estimated by ratio of the revolutions of the engine and that of a turbine.

6. The method, as defined in claim 1, wherein the outside air temperature is obtained by estimating a change rate in the operational oil temperature relative to the amount of heat generated by the torque converter and change rate in the operational oil temperature relative to the amount of heat generated by the torque converter from the related outside air temperature.

7. The method, as defined in claim 1, wherein said determining an oil temperature correction value is performed by using a map data of various correction values experimentally estimated according to various outside air temperature ranges to thereby enable the operational oil temperature to reach its normal state within a preset temperature range at a time of tuning of the transmission.

8. The method, as defined in claim 1, wherein controlling operation of the damper clutch includes a transmission control unit controlling a solenoid valve of the damper clutch when the operational oil temperature reaches a temperature obtained by considering a correction value selected according to the outside air temperature.

9. A method for controlling a damper clutch in an automatic transmission with a torque converter, comprising:
    determining an outside air temperature in which the transmission is operating;
    determining oil temperature of the transmission;
    determining a point for direct connection of the torque converter to the transmission wherein said point incorporates a correction value of the transmission oil temperature based on the determined outside air temperature; and
    controlling the damper clutch for direct connection in accordance with said determined point.

10. The method according to claim 9, wherein said point for direct connection corresponds to a temperature of operating oil in the transmission.

11. The method according to claim 9, wherein said determining an outside air temperature comprises:
    sensing an operational oil temperature for the transmission at an initial start stage;
    determining an amount of heat generated by the torque converter over a predetermined initial time period;
    determining a rate of increase in the operational oil temperature of said predetermined time period based on the amount of heat generated; and
    estimating the outside air temperature based on the sensed oil temperature and the determined rate of increase of the oil temperature.

12. The method according to claim 11, wherein said determining a point comprises selecting an oil temperature correction value corresponding to a difference between a normal direct connection temperature and a direction connection temperature adjusted for the determined outside air temperature.

13. The method according to claim 12, wherein said correction value is selected from a predetermined data map of correction values corresponding to outside temperatures.

14. A power transmission system, comprising:
    an engine;
    a torque converter receiving power input from the engine;

an automatic transmission providing power output;

a damper clutch operatively connecting said engine and transmission;

an operating oil temperature sensor communicating with said transmission; and a controller receiving oil temperature input from said sensor, said controller operatively communicating with the damper clutch to control direct connection of the engine and automatic transmission via said damper clutch, said controller including instructions for estimating outside air temperature based on sensed operating oil temperature and heat generated by the torque converter, determining an operating temperature for direct connection based on the estimated outside air temperature, and controlling the damper clutch to directly connect the engine and automatic transmission at said determined operating temperature for direct connection.

15. The power transmission system according to claim 14, further comprising a solenoid valve operatively connected to the damper clutch to effectuate said direct connection, wherein said controller communicates with said solenoid valve.

16. A method for controlling a damper clutch in an automatic transmission with a torque converter, comprising:

determining an outside air temperature in which the transmission is operating, wherein said determining comprises:

sensing an operational oil temperature for the transmission at an initial start stage, determining an amount of heat generated by the torque converter over a predetermined initial time period, determining a rate of increase in the operational oil temperature of said predetermined time period based on the amount of heat generated, and estimating the outside air temperature based on the sensed oil temperature and the determined rate of increase of the oil temperature;

determining a point for direct connection of the torque converter to the transmission based on the determined outside air temperature, wherein said point for direct connection corresponds to a temperature of oil in the transmission; and controlling the damper clutch for direct connection in accordance with said determined point.

17. The method according to claim 16, wherein said determining a point comprises selecting an oil temperature correction value corresponding to a difference between a normal direct connection temperature and a direction connection temperature adjusted for the determined outside air temperature.

18. The method according to claim 17, wherein said correction value is selected from a predetermined data map of correction values corresponding to outside temperatures.

* * * * *